R. T. J. MARTIN.
PRESSED METAL SEAT.
APPLICATION FILED APR. 12, 1906.

1,014,013.

Patented Jan. 9, 1912.

2 SHEETS—SHEET 1.

WITNESSES:

INVENTOR.
Robert T. J. Martin,
BY
Bates, Fouts & Hull,
ATTYS.

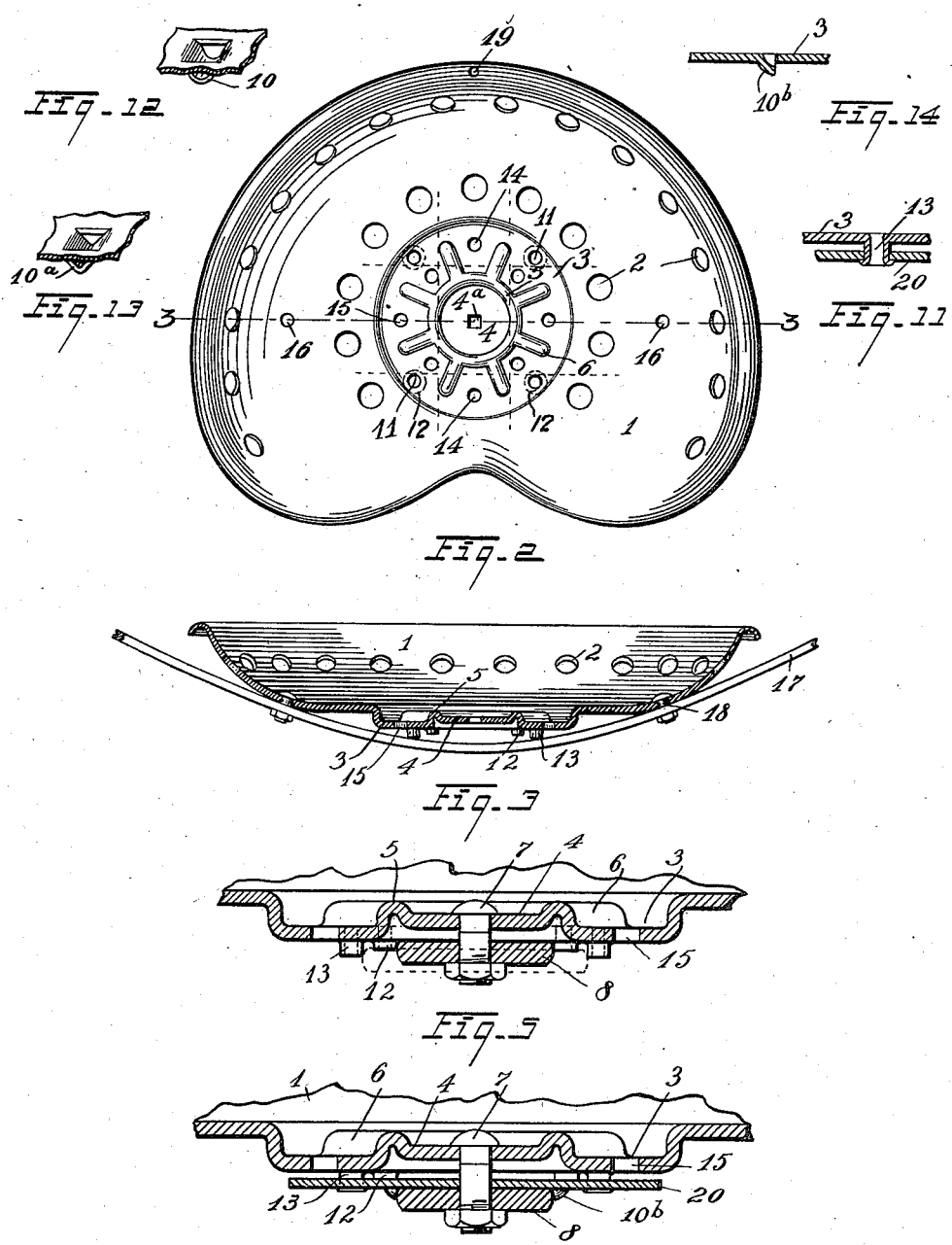

UNITED STATES PATENT OFFICE.

ROBERT T. J. MARTIN, OF ELYRIA, OHIO.

PRESSED-METAL SEAT.

1,014,013.  Specification of Letters Patent.  Patented Jan. 9, 1912.

Application filed April 12, 1906.  Serial No. 311,264.

*To all whom it may concern:*

Be it known that I, ROBERT T. J. MARTIN, residing at Elyria, in the county of Lorain and State of Ohio, have invented a certain new and useful Improvement in Pressed-Metal Seats, of which the following is a full, clear, and exact description, reference being had to the accompanying drawings.

My invention relates to seats for agricultural machines, implements, vehicles, etc., that are made from sheet material, preferably light gage sheet steel, and has for its object the production, at the least cost, of a seat of this character that may be readily attached to various forms and widths of seat supports; that shall be provided with a peculiar form and arrangement of perforations whereby the strength of the seat shall be preserved, waste of material avoided, the facility of attachment to such supports shall be enhanced, and whereby reinforcing plates may be secured thereto in a simple and effective manner.

Generally speaking, the invention may be defined as consisting of the combinations of elements set forth in the specification and drawings and embodied in the claims hereto annexed.

Figure 1:
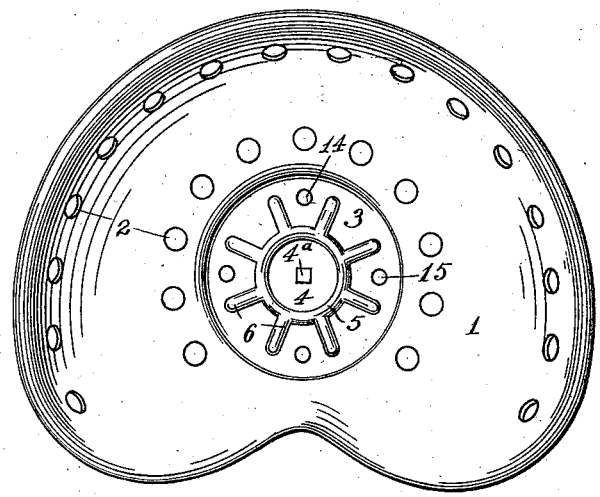
Figure 4:
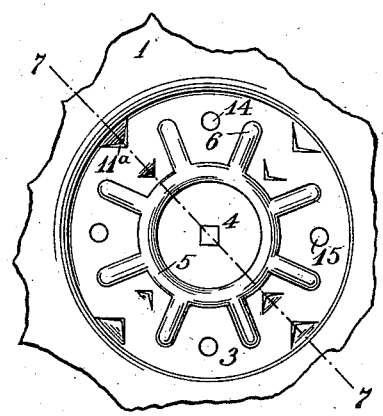
Figure 7:
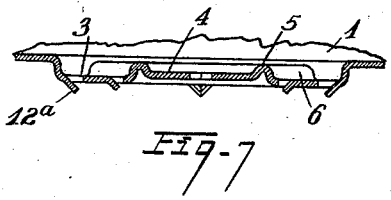
Figure 8:
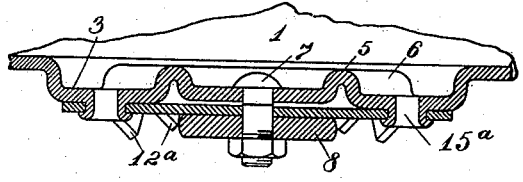
Figure 9:
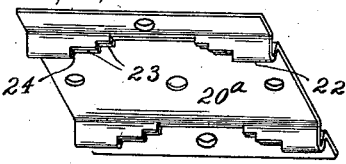
Figure 10:
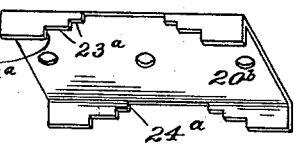

Referring to the drawings, Figure 1 represents a plan view of a seat having perforations therein for ventilation, draining, and for attaching the same to a standard and a reinforcing plate. Fig. 2 represents a similar view of the seat after it has been subjected to the next operation, whereby it is provided with perforations that may be formed into guides for seat supports, for attaching the seat to a hammock-pattern seat-support, and for supporting therefrom a portion of the implement with which the seat is to be used. Fig. 3 represents a sectional view of said seat on the line 3—3 of Fig. 2, showing the manner in which it may be applied to a hammock-seat support. Fig. 4 represents an enlarged detail view of the seat center indicating a modification of the seat support-guide perforations shown in Fig. 2. Fig. 5 represents an enlarged sectional detail of the lower portion of the seat shown in Fig. 2, showing the same constructed without a reinforcing plate. Fig. 6 represents a corresponding view, showing the reinforcing plate applied thereto. Fig. 7 represents a sectional detail of the seat center shown in Fig. 4. Fig. 8 shows a similar view of such seat center, with the reinforcing plate applied thereto. Figs. 9 and 10 represent perspective views of reinforcing plates which may be used with any seat, showing the manner in which guides for the seat-support may be formed therein. Fig. 11 represents a sectional detail of one of the eyelets, showing the manner in which the reinforcing plate may be secured to the seat. Figs. 12, 13, and 14 represent modifications of seat support guides.

The seat 1 is formed from a blank of sheet metal which is swaged to the desired shape. This seat is provided with two or more rows of perforations 2 located between the central portion 3 of the seat and the outer edge thereof, the outer row being located at a short distance from the rounded sides and back of the seat, and the inner row being located a short distance from the central portion of the seat. The perforations usually provided for seats of this character are elongated or irregularly shaped slots, and the provision of slots of such shape not only weakens the seat body, but results in a substantial loss of material, as the punchings from slots of such shape command only the price of scrap.

As will appear from an inspection of Figs. 1, 2 and 3, the perforations which I employ are round or circular. These perforations are preferably about seven-eighths of an inch in diameter and are so arranged that the holes in the inner row are staggered as much as possible with those on the outer row, thus preserving the strength of the plate. A further and important point of advantage in circular perforations is that owing to the size of the perforations and the thinness of the sheet, the punchings therefrom may be again punched in the central portion, making washers which sell at a very high figure as compared with the price obtainable from punchings as heretofore made, which are fit only for scrap which commands but a small price.

The portion 3 of the central portion of the seat is depressed, and the portion 4 of such center is provided with a circular bead or rib 5 from which radiates a series of ribs 6, projecting upwardly to the same level as the bead 5 and substantially to the same level as the top of the head of the bolt 7 by which the seat is secured to the spring 8 of the machine or vehicle. The bead or rib 5 and the radiating ribs 6 are located entirely within the central depression 3. As will appear from Fig. 3, the portion 3 (outside of the annular rib 5) is in a lower plane than the portion 4 within such rib, which is not depressed in forming the seat, whereby the seat and the load thereon may be entirely supported by such portion 3. Beyond the depressed portion 3, the seat rises again to substantially the level of the top of the bead and ribs, and then extends upwardly and outwardly and downwardly to form the sides, back and front of the seat.

In constructing the seat, the blank is first bent to shape and provided with the perforations 2, square bolt head perforation $4^a$, and the openings 14 and 15,—the former being substantially on a line extending through the perforation $4^a$, from front to back of the seat, and the latter being substantially on a line extending through $4^a$ at right angles to the former line. At the next operation, the seat is provided with perforations adapted to form seat-support guides, with other perforations enabling it to be secured to a hammock-pattern seat-support, as well as with a perforation from which a portion of the implement with which the seat is to be used may be suspended.

The seat-support guides may be formed by cutting through the metal of the seat and swaging said metal downwardly from the cut, thus forming spring guide projections 10, (Fig. 12,) $10^a$ (Fig. 13), or $10^b$ (Fig. 14). Other manners of providing such guide projections, however, are illustrated in Figs. 2, 5, 7 and 11. In Figs. 2, 5 and 11, the central portion of the seat, outside of the bead, is provided with a series of circular perforations 11, arranged diagonally with respect to the direction of the seat-supports, said supports being indicated in dotted lines in Fig. 2. The metal surrounding these perforations may then be swaged downwardly, as indicated more particularly in Figs. 5 and 11,—the metal thus swaged projecting downwardly a greater distance from one set of the perforations than from another, thereby enabling seat-supports of varying widths to be accommodated between projections. For instance, I have shown the outer perforations as those from which the longer projections will extend. In Fig. 5, a narrow seat-support 8 is shown in full lines, said support being engaged by the inner projections 12. A wider seat-support is shown in dotted lines in said figure, the edges of said support being engaged by the outer projections 13, while the upper face of the support abuts against the lower surface of the projections 12. I may, however, form seat-support guides in the manner illustrated in Fig. 4, wherein a similar arrangement of perforations is shown as in the case of Fig. 2, the perforations in this case, however, being provided by cutting V-shaped perforations $11^a$ in the metal, the apex of the V being directed toward the center of the seat. The metal may then be bent down in the manner indicated in Figs. 7 and 8 to form guides $12^a$ for seat supports of varying widths. As in the case of the circular perforations, the outer seat-support guides may project down farther than the inner, enabling the seat to accommodate different widths of supports. In Figs. 4 and 7 the seat is provided with guides which are formed from the body of the seat itself. The seat may, however, be provided with guides projecting from a reinforcing plate secured thereto, as shown in Figs. 8, 9 and 10.

The perforations 14 serve to drain the center of the seat and may also be employed as an additional means for securing the seat to a support, preferably conjointly with the central square perforation $4^a$. The perforations 15 also serve to drain the seat, and the metal surrounding the same may be depressed downwardly to form eyelets $15^a$, to secure the reinforcing plate to the seat in the manner described in my application No. 244,946, filed March 13th, 1905. Still other circular perforations 16 are provided in the seat, between the central portion and the outer edge thereof, and in a plane extending through the center of the seat and transversely thereof. That is to say, said perforations are in a plane at substantially right angles to a line joining the central portions of the front and back of the seat. These perforations are adapted for securing the seat to a hammock support 17, as indicated in Fig. 3. This is conveniently accomplished by means of short bolts 18 extending through the perforations and through corresponding perforations in the seat support. By providing the support with numerous perforations, the position of the seat may be adjusted with reference to the support and the seat may be secured in proper relation thereto. Near the rear edge of the seat, there is provided a small circular perforation 19 to which a portion of the implement, as a rake, may be attached for the purpose of supporting the same when not in action.

When it is desired to use a reinforcing plate 20 for the central portion of the seat, the latter should be provided with guides for the seat support. These guides are illustrated in Figs. 6, 8, 9 and 10 and may be conveniently formed by slitting the metal of the plate and depressing the metal on one side of the slit. In Fig. 6 lips $10^b$ are provided which are adapted to engage the sides of the seat support. In this case, the outer circular perforations 11 may be made use of to secure the reinforcing plate in place. This is accomplished by perforating the plate and by inserting therethrough the projections 13 formed by swaging downwardly the metal surrounding the outer perforations 11, after which the metal projecting through the plate is upset against the lower face thereof, in the manner indicated in Figs. 6 and 11. The lower ends of the short projections 12 extending from the inner circular perforations 11 serve as abutting surfaces for the upper face of the plate 20.

In Figs. 9 and 10, I have shown still other forms of seat support guides, said guides, in the embodiments shown, being provided on reinforcing plates. In Fig. 9, the metal body of the plate 20ª is provided with a pair of downwardly projecting ribs 22, formed by bending or crimping the plate, as shown, intermediate the ends thereof. Each rib is cut to provide step-like guide projections 23, the vertical faces 24 of which engage the seat support. In Fig. 10, I have shown a construction of plate 20ᵇ, similar to 20ª, the step-like projections 23ª and faces 24ª being provided in flanges projecting downwardly from opposite edges of the plate. It will be observed that the seat-guide projections in both Figs. 9 and 10 vary in depth, the amount of projection increasing from the central portion of the plate outwardly, as is the case with the projections 12 and 12ª.

From the foregoing description, it will be seen that, by the shape, size and arrangement of the perforations which I employ, the seat is possessed of a wide range of adaptability. The large perforations 2 serve to ventilate the seat and to lighten the weight of the same. At the same time, their arrangement is such as to produce these results without materially weakening the seat. A very important feature of these perforations resides in the fact that, in forming the same, the metal is punched out from the sheet and, owing to the size of the perforations and the thinness of the metal, these punchings may themselves be again punched in the center to form washers. The provision of the circular perforations 11, 14, 15, 16 and 19 serves to drain the central portion of the seat, to provide seat support guides capable of accommodating supports of varying widths, to secure the reinforcing plate in place, to employ the seat with a hammock-pattern support, and to attach thereto a portion of the implement which may not be in action or operation.

I claim:

1. A seat made from sheet material and provided with an inner and an outer series of circular perforations, the metal surrounding said perforations being swaged downwardly and the metal surrounding the perforations in the outer series projecting downwardly a greater distance than that surrounding the perforations in the inner series, substantially as specified.

2. The combination, with a metallic supporting member, of a seat made from sheet metal and having circular perforations, some located to form ventilating means for the seat, others located so as to drain the central portion of the seat, the latter perforations having the metal surrounding them swaged downwardly and outwardly so as to engage said support, the perforations being unobstructed.

3. The combination, with a metallic supporting member, of a seat made from sheet metal and having circular drainage perforations formed in the bottom thereof, said supporting member being formed with similar perforations registering with the perforations in said seat, and the metal surrounding said seat perforations being swaged downwardly from the perforations in said supporting member and outwardly so as to engage the edges of said perforations, the passage through said perforations being unobstructed.

4. A seat made from sheet material and provided with an inner and an outer series of perforations, the metal adjacent said perforations being depressed downwardly to form guides for seat supports of varying widths, substantially as specified.

5. A seat made from sheet material and provided with an inner and an outer series of perforations, the metal adjacent said perforations being depressed downwardly to form an inner and an outer series of guide projections for seat supports of varying widths, one series of projections extending downwardly a greater distance than the other series, substantially as specified.

6. A seat made from sheet material and being provided with a plurality of sets of depressions for seat support guides, one of such sets of depressions being arranged outside the other set, said depressions being of unequal length, the depressions of the outer set being of greater length than those of the inner set, substantially as specified.

7. A seat made from sheet material and having on its underside projections constituting seat support guides, the length of said projections increasing from the central portion of the seat toward the periphery thereof, substantially as specified.

In testimony whereof, I hereunto affix my signature in the presence of two witnesses.

ROBERT T. J. MARTIN.

Witnesses:
J. B. HULL,
W. L. McGARRELL.

---

Copies of this patent may be obtained for five cents each, by addressing the "Commissioner of Patents, Washington, D. C."